United States Patent [19]

Edwards

[11] 4,283,988
[45] Aug. 18, 1981

[54] TAIL CARRIAGE OF STORES

[75] Inventor: Kenneth M. Edwards, Niceville, Fla.

[73] Assignee: The United States of America as represented by the Secretary of the Air Force, Washington, D.C.

[21] Appl. No.: 66,358

[22] Filed: Aug. 14, 1979

[51] Int. Cl.³ .............................................. F41F 5/02
[52] U.S. Cl. .................................. 89/1.5 R; 89/1.5 C; 102/2; 102/382
[58] Field of Search .................. 89/1 A, 1.5 R, 1.5 C, 89/1.5 H; 102/2, 3; 244/137 R, 118.1, 136

[56] References Cited

U.S. PATENT DOCUMENTS

| | | | |
|---|---|---|---|
| 2,470,120 | 5/1949 | Walker | 89/1.5 C |
| 2,723,093 | 11/1955 | Price et al. | 244/137 R |
| 3,056,335 | 10/1962 | Thieblot et al. | 89/1.5 R |
| 3,295,410 | 1/1967 | Edwards | 89/1.5 R |
| 3,459,099 | 8/1969 | Litz et al. | 89/1.5 R |
| 3,517,584 | 6/1970 | Robinson et al. | 89/1.5 R |
| 3,724,373 | 4/1973 | Rivenes | 89/1.5 R X |
| 4,161,301 | 7/1979 | Beardsley et al. | 244/137 R |

*Primary Examiner*—David H. Brown
*Attorney, Agent, or Firm*—Donald J. Singer; Arsen Tashjian

[57] ABSTRACT

A system for carrying and rearwardly launching and/or ejecting a store from an aircraft while flying at low altitudes. The store which may be in the form of a bomb, pod, missile, etc. is mounted at the top of one or more vertical stabilizers at the aft end of the aircraft. Aerodynamic lift and drag generated by the store shape causes the store to separate from the aircraft and move upward and aft therefrom. The store becomes a lifting body and gains altitude before falling on target thus enabling the carrying aircraft to remove itself from the blast area preventing possible damage to the aircraft.

2 Claims, 2 Drawing Figures

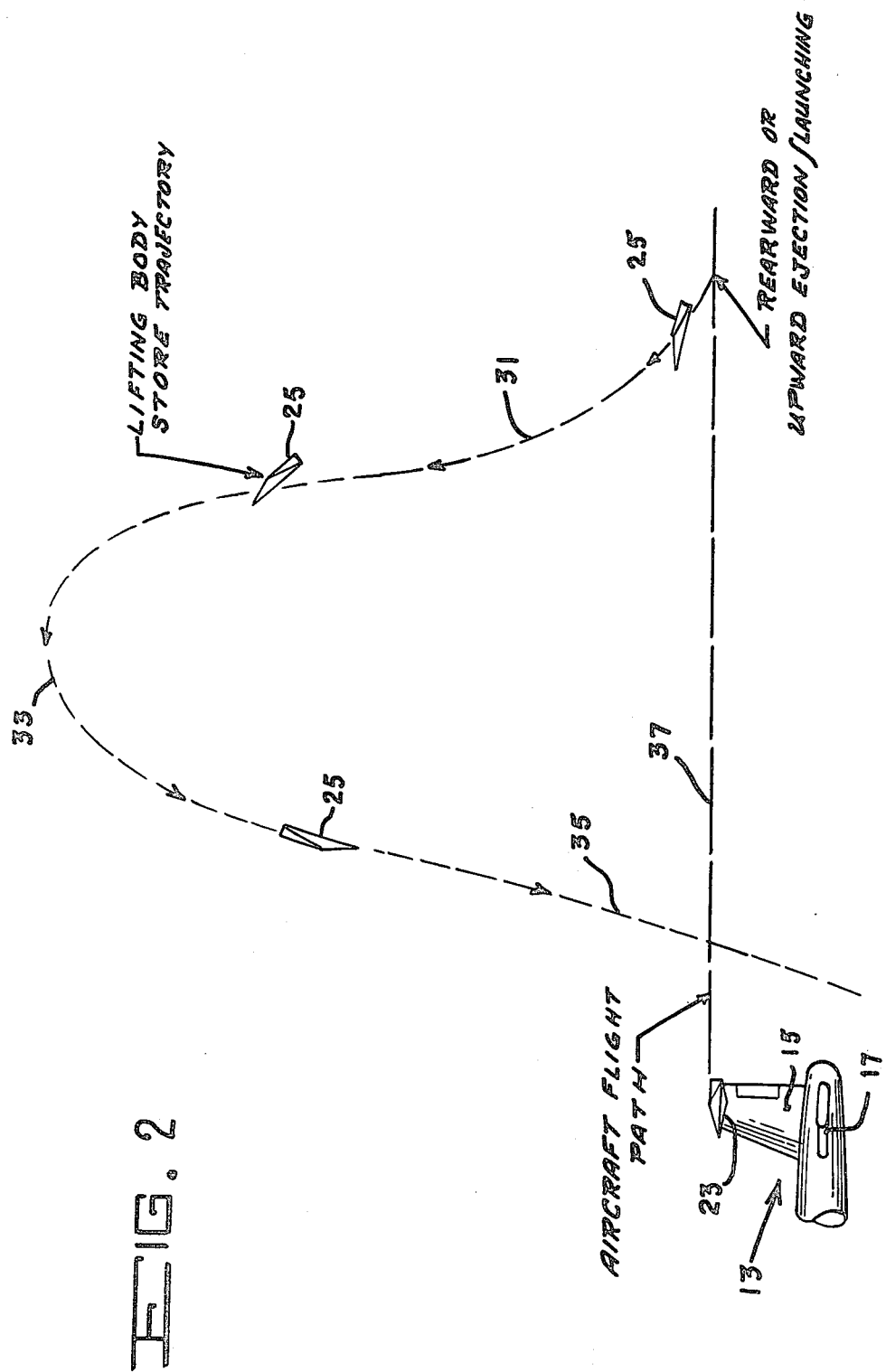

TAIL CARRIAGE OF STORES

STATEMENT OF GOVERNMENT INTEREST

The invention described herein may be manufactured and used by or for the Government for governmental purposes without the payment of any royalty thereon.

BACKGROUND OF THE INVENTION

This invention relates to the carriage and release of external stores from an aircraft and, more particularly, the invention is concerned with providing a system for safely separating stores in the form of bombs, pods, etc. from aircraft traveling at low altitudes by mounting the aerodynamically shaped store on top of the vertical stabilizer at the aft end of the aircraft so that, after release, the store lifts up and away from the carrying aircraft before falling on target.

There has always been a problem connected with the separation of stores from a low flying aircraft in a safe manner because of the possibility of the blast from the store causing damage to the delivery aircraft before it can leave the target area.

Heretofore, one of the conventional procedures for releasing stores from a low flying aircraft was to launch in a rearward direction so that the aircraft could vacate the target area prior to explosion of the store. However, this system leaves a lot to be desired because of the complicated launching mechanism required which adds considerably to the overall weight of the aircraft and because of the difficulty in controlling the flight of the store after it leaves the aircraft since it falls only a short distance before reaching the ground. The time lapse between launch and blast is so short that it is virtually impossible to guide the missile or to reach a safe area unless some powered ejection technique is utilized such as rearward rail launch or upward ejection piston arrangements.

Thus it can be seen that there is a real need for providing a safe means for separating stores from low flying aircraft without the dangers and disadvantages noted above. The stores should be placed on the aircraft in a location where there would be a minimum aerodynamic disturbance of the flow field so as not to adversely affect the operation of the aircraft. Also, the aerodynamic lift and drag generated by the store should be utilized to move it upward and away from the aircraft after release therefrom without the requirement for any elaborate launching mechanism, such as rails and ejector pistons.

SUMMARY OF THE INVENTION

The present invention is concerned with providing a tail carriage of stores wherein the stores which are aerodynamically shaped, are positioned on a cross-member attached to the top of a vertical stabilizer so that the aerodynamic lift and drag generated by the store shape causes it to move upward and away from the aircraft upon separation therefrom.

Accordingly, it is an object of the invention to provide a tail carriage of stores wherein aerodynamically shaped stores are placed atop the vertical stabilizer on the tail of the carrying aircraft in relatively undisturbed flow field.

Another object of the invention is to provide a tail carriage of stores wherein the aerodynamic interference problems generally created by the carriage of stores is minimized by the "T-tail" arrangement of the present invention. Still another object of the invention is to provide a tail carriage of stores wherein the aerodynamic lift forces generated by the uniquely shaped store reduces the tendency of the tail to vibrate and improve parent aircraft performance while at the same time, the forces permit the store to be safely separated from the aircraft so that the aerodynamic lift and drag generated by the store causes it to move upward and aft from the aircraft.

A further object of the invention is to provide a tail carriage of stores wherein the stores positioned on the top of the carrying aircraft vertical stabilizer provides end plate effects to reduce tip vortices and smooth air flow.

A still further object of the invention is to provide a safe means of separating stores from a low flying aircraft by locating aerodynamically configurated stores atop the vertical stabilizer of the carrying aircraft and allowing the aerodynamic lift and drag generatedd by the store to cause it to become a lifting body and gain altitude before falling on target enabling the aircraft to remove itself from possible blast damage.

These and other objects, features and advantages will become more apparent after considering the following detailed description taken in conjunction with the annexed drawings and appended claims.

BRIEF DESCRIPTION OF THE DRAWINGS

FIG. 2 is a view of the trajectory of the aerodynamically configured store aircraft showing the lifting body effect before falling on target.

DESCRIPTION OF THE PREFERRED EMBODIMENT

Figure 1:
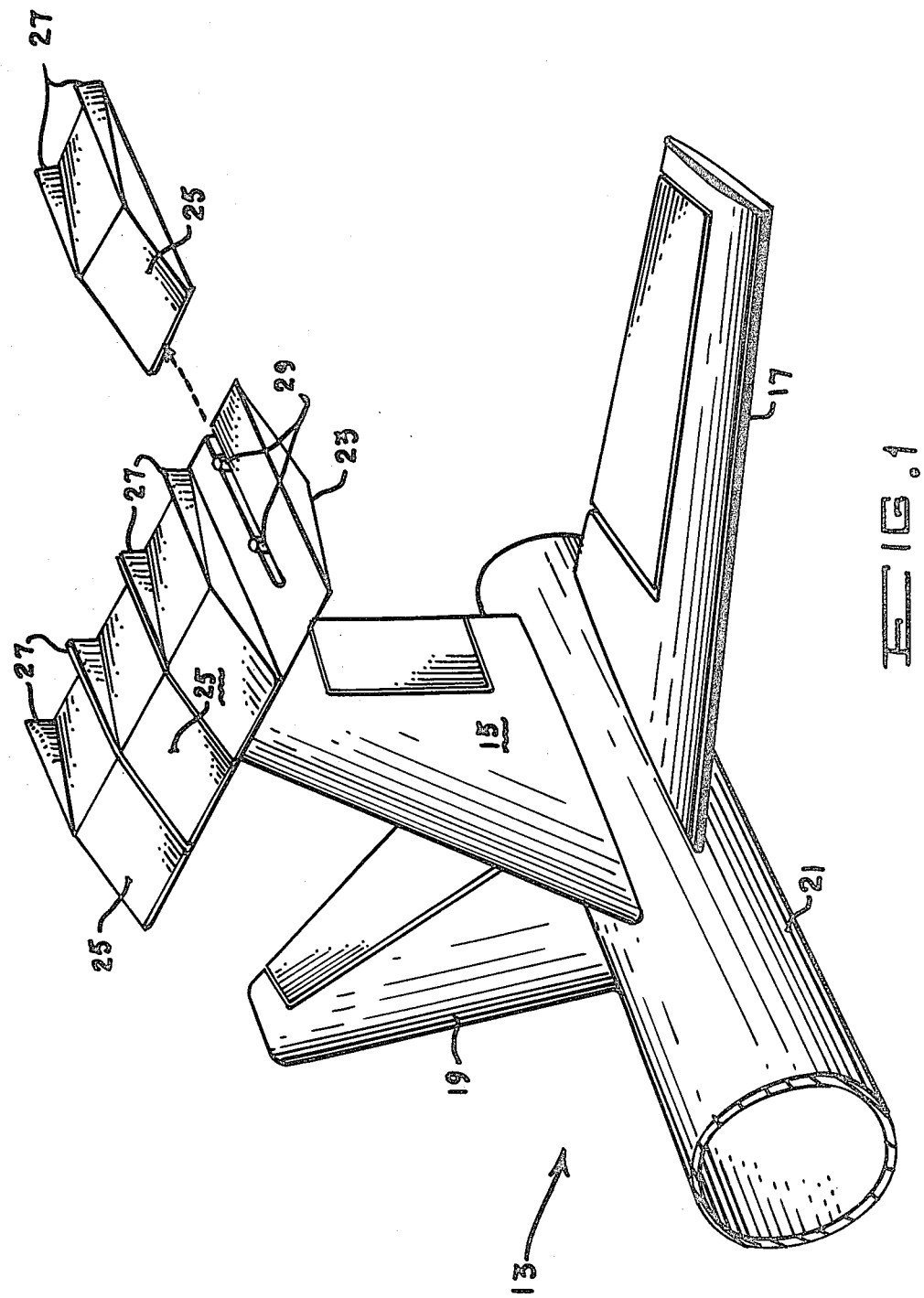
FIG. 1 is a view in perspective of the tail assembly of a modern high performance military aircraft with a tail carriage of stores attached thereto according to the invention and suitable for use during a low flying bombing mission.

Referring now to the drawings in which like reference numerals refer to like elements in the two views, FIG. 1 shows a tail assembly 13 of a typical military aircraft having a vertical stabilizer 15 and horizontal stabilizers 17 and 19. The tail assembly 13 is positioned on the aft portion of the aircraft fuselage 21. A platform 23 is attached to the top of the vertical stabilizer 15 perpendicular to the longitudinal axis of the aircraft and substantially parallel to the horizontal stabilizers 17 and 19. A plurality of store 25 are positioned across the top of the platform 23 in a horizontal row. The stores 25 are aerodynamically configured and include the fins 27 for providing aerodynamic flight control to the missile when in flight.

A suitable releasing means 29 operates to release the store 25 upon a given signal causing the store 25 to leave the platform 23 and the kinetic energy produced by the forward speed of the carrying aircraft causes the store 25 to be launched in an upward flight trajectory 31 shown in FIG. 2. When the store 25 reaches the desired altitude at 33, it starts on its downward trajectory 35 and falls until it lands on target. Meantime the carrying aircraft has had time to leave the area and is not affected by the blast from the store 25 when it explodes on target.

Thus, it can be seen that the hereinbefore described invention provides a means for carrying and ejecting a plurality of stores 25 from an aircraft flying at low altitudes. The stores 25 (bombs, pods, missiles, etc.) are in the form of lifting bodies which are releasably attached to the top of the vertical fin 15 of the aircraft forming, in appearance, a "T-tail" configuration. Upon release, the store 25 separates from the aircraft and, because of its forward momentum and aerodynamic configuration, rises in a free-flight trajectory 31 well above the level flight path 37 of the aircraft to a height 33 after which, upon loss of momentum and lift, it falls to the ground along the path 35.

Although the invention has been illustrated in the foregoing specification in terms of a preferred embodiment thereof, the invention is not limited to this embodiment or to the particular configuration shown and described. It will be apparent to those skilled in the art that certain changes, modifications and substitutions can be made with respect to the shape of the elements without departing from the true spirit and scope of the appended claims. It can be seen that the invention may also be used in the same manner that conventional powered ejection techniques such as launching rails and/or upward ejection pistons to augment aerodynamic separation forces.

Having thus set forth the nature of my invention, what I claim as new and desire to secure by Letters Patent of the United States is:

1. In combination, a tail carriage of stores on a low-flying aircraft having a tail assembly with horizontal and vertical stabilizers at the aft end of the fuselage thereof and a plurality of aerodynamically configurated stores disposed on the tail assembly, a platform positioned atop the vertical stabilizer for releasably carrying said stores thereon, said platform being oriented perpendicular to the longitudinal axis of the fuselage of the aircraft and parallel to the horizontal stabilizers, means for releasing said stores from said platform causing one of said stores to separate from the aircraft such that the forward momentum of the aerodynamically configurated store produces a lifting force causing the store to rise in a free-flight trajectory well above the level flight of the aircraft whereupon the store loses momentum and falls to the ground after the aircraft has cleared the area.

2. The combination of tail carriage and stores on a low flying aircraft defined in claim 1 wherein said plurality of aerodynamically configurated stores are juxtaposed in a single row parallel to the longitudinal axis of the aircraft across the top of the platform with the front of the stores oriented toward the front of the aircraft.

* * * * *